United States Patent [19]

Kinami et al.

[11] Patent Number: 5,317,415
[45] Date of Patent: May 31, 1994

[54] DATA COMMUNICATION METHOD USING A PLURALITY OF LINES

[75] Inventors: Hideo Kinami; Yoshihiro Maei; Masahiro Mochizuki; Yoshiaki Tezuka; Takashi Sakayama; Shinichiro Nagoya; Hiroaki Sakaki; Yosuhiro Kamiyama, all of Saitama, Japan

[73] Assignee: Fuji Xerox Co., Ltd., Tokyo, Japan

[21] Appl. No.: 9,035

[22] Filed: Jan. 26, 1993

[30] Foreign Application Priority Data

Jan. 28, 1992 [JP] Japan .................... 4-035825

[51] Int. Cl.⁵ .................... H04N 1/00; H04J 3/12
[52] U.S. Cl. .................... 358/425; 358/434; 358/442; 370/110.1
[58] Field of Search ........ 358/400, 402, 407, 425, 358/426, 433, 434, 435, 437, 439, 442, 468; 370/85.9, 85.11, 85.1, 94.1, 110.1, 112; 379/100

[56] References Cited

U.S. PATENT DOCUMENTS

| | | | |
|---|---|---|---|
| 4,703,475 | 10/1987 | Dretzka et al. | 370/60 |
| 4,888,766 | 12/1989 | Ogasawara | 370/110.1 |
| 5,051,992 | 9/1991 | Taniguchi et al. | 370/110.1 |
| 5,142,525 | 8/1992 | Nakatsuma | 370/110.1 |

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A data communication method in which a transmitting station divides data into a plurality of data blocks and transmits the data blocks in parallel through a plurality of communication lines, and a receiving station receives the data blocks transmitted from the transmitting station through the plurality of communication lines and composes the data blocks into original data. In the data communication method, it is detected that a new transmission request is present during a parallel data transmission through a plurality of communication lines, one or more of the communication lines are released to continuously use the remaining communication lines for the parallel data transmission in response to the detected new transmission request, and a new data transmission is performed through the released communication line or lines.

4 Claims, 8 Drawing Sheets

DATA COMMUNICATION METHOD USING A PLURALITY OF LINES

BACKGROUND OF THE INVENTION

1. Field of the Invention

The present invention relates to a data communication method using a plurality of communication lines. More particularly, the invention relates to a data communication method in which a plurality of communication stations each operable in transmitting and receiving modes are contained, and one communication station, when operating in a transmitting mode, divides data into a plurality of data blocks and sends the data blocks in parallel through a plurality of communication lines to the other communication station, while the other communication station, which receives the data blocks, operates in a receiving mode to receive the data blocks coming in through the plurality of communication lines and composes or synthesizes the data blocks into the original data.

2. Discussion of the Related Art

In a conventional data communication system, only one communication line is used for data communication between communication stations, for example, facsimile devices. Accordingly, the communication data is serially transmitted through one communication line. For this reason, much time is taken for the transmission of image data containing a great amount of information, such as image data of news paper or magazines.

However, in recent years, an integrated service digital network (ISDN) for handling digital information has been put into practical use. With the ISDN, a plurality of communication lines can be currently used for data communication.

The ISDN is a communication network in which the information output from various types of communication devices, such as telephones, facsimile devices, telexes, and the like, which are connected through a bus to a domestic service line terminal unit (DSU), are arranged into the information of a digital form, enabling parallel data communication among those devices through a plurality of communication lines.

With prevalence of the ISDN, a new communication system, called a super-high-speed communication system, has been proposed. In this communication system, communication data is divided into a plurality of data blocks, and those data blocks are transmitted in parallel through a plurality of communication lines.

Articles describing the super-high-speed communication system using a plurality of communication lines disclose general ideas of the communication system. However, any of those articles does not disclose the detailed techniques of the communication system.

To be more specific, when a transmitting station is sending block data to another station in a super-high-speed communication mode, if all of the communication lines are used by the currently progressing communication in the super-high or normal speed communication mode, viz., free communication lines are absent, the transmitting station cannot send another document data.

SUMMARY OF THE INVENTION

The present invention has been made in view of the above circumstances and has an object to provide a data communication method in which new document data can be transmitted even under the condition that all of the communication lines are occupied by the data transmission in a super-high-speed communication mode.

To achieve the above object, the invention provides a data communication method in which a transmitting station divides data into a plurality of data blocks and transmits the data blocks in parallel through a plurality of communication lines, and a receiving station receives the data blocks transmitted from the transmitting station through the plurality of communication lines and composes the data blocks into original data, the data communication method including the steps of detecting that a new transmission request is present during a parallel data transmission through a plurality of communication lines, releasing at least one of the communication lines to continuously use the remaining communication lines for the parallel data transmission in response to the detected new transmission request, and performing a new data transmission through the released communication line.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENT

A data communication method according to an embodiment of the present invention will be described with reference to the accompanying drawings. In this embodiment, the data communication system includes a plurality of communication stations each capable of transmitting and receiving data through a plurality of communication lines.

Figure 1:
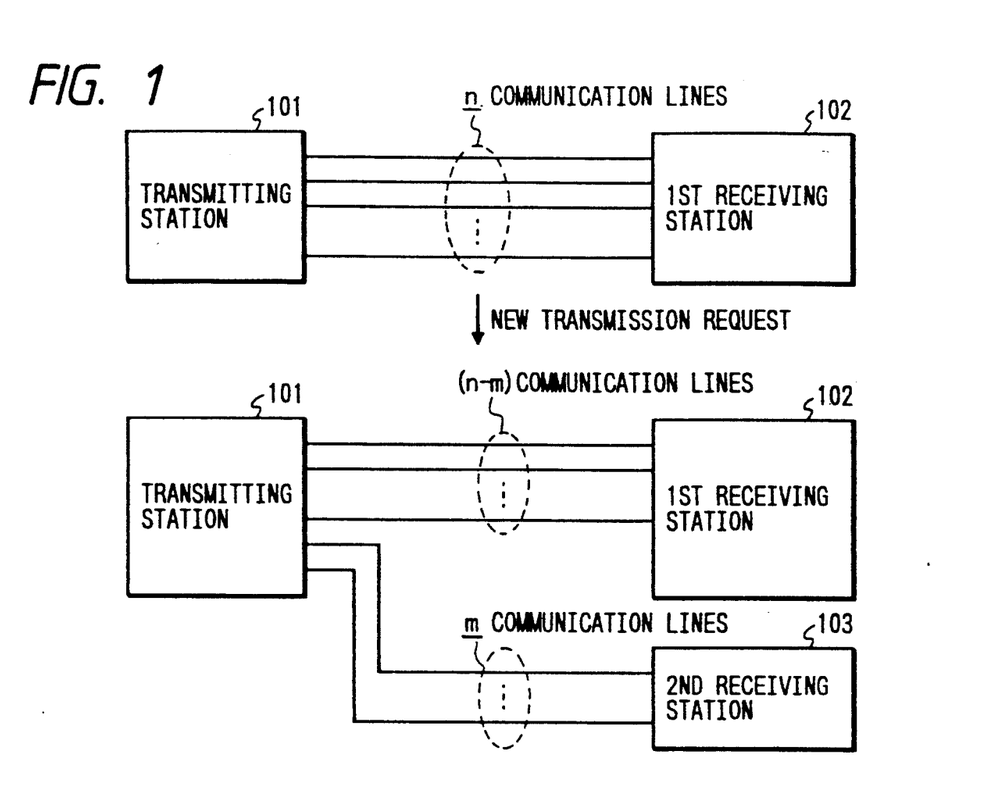
FIG. 1 is a block diagram functionally showing the present invention relating to a data communication method using a plurality of communication lines.

Referring to FIG. 1, there is shown in block form a technical idea of the present invention.

In a case where a transmitting station 101 is transmitting data in parallel through an n number of communication lines to a first receiving station 102, when the transmitting station 101 receives a new transmission request signal, which requests the transmitting station to send data to a second transmitting station 103, some (m) of the n number of communication lines are released. The parallel data transmission from the transmitting station 101 to the receiving station 102, which has thus far been performed, is continued using the remaining communication lines (n - m). The new data transmission from the transmitting station 101 to the second receiving station 103 is performed through the m number of released lines.

Figure 2:
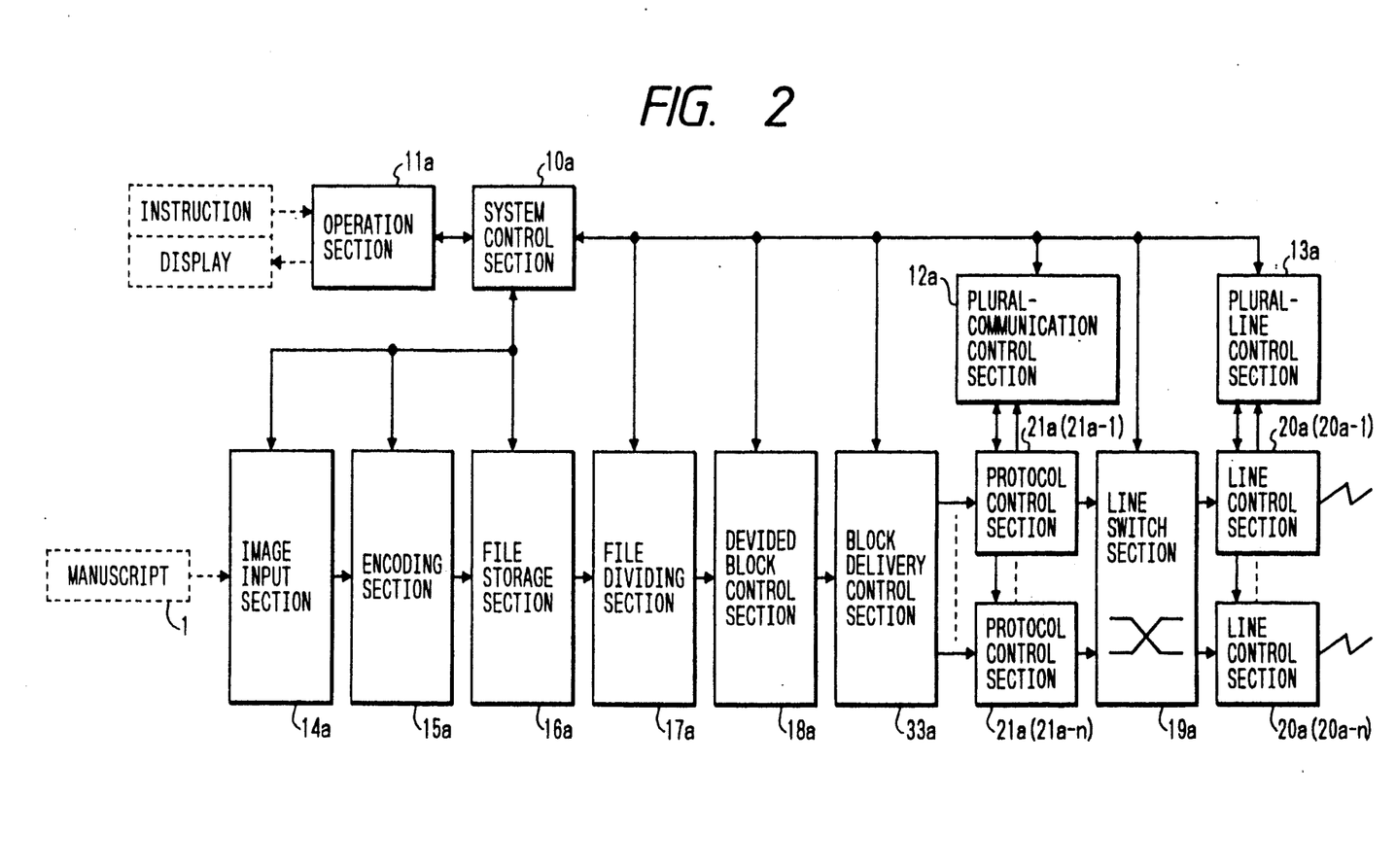
FIG. 2 is a block diagram showing an arrangement of a facsimile device when it operates in a transmitting mode.
Figure 3:
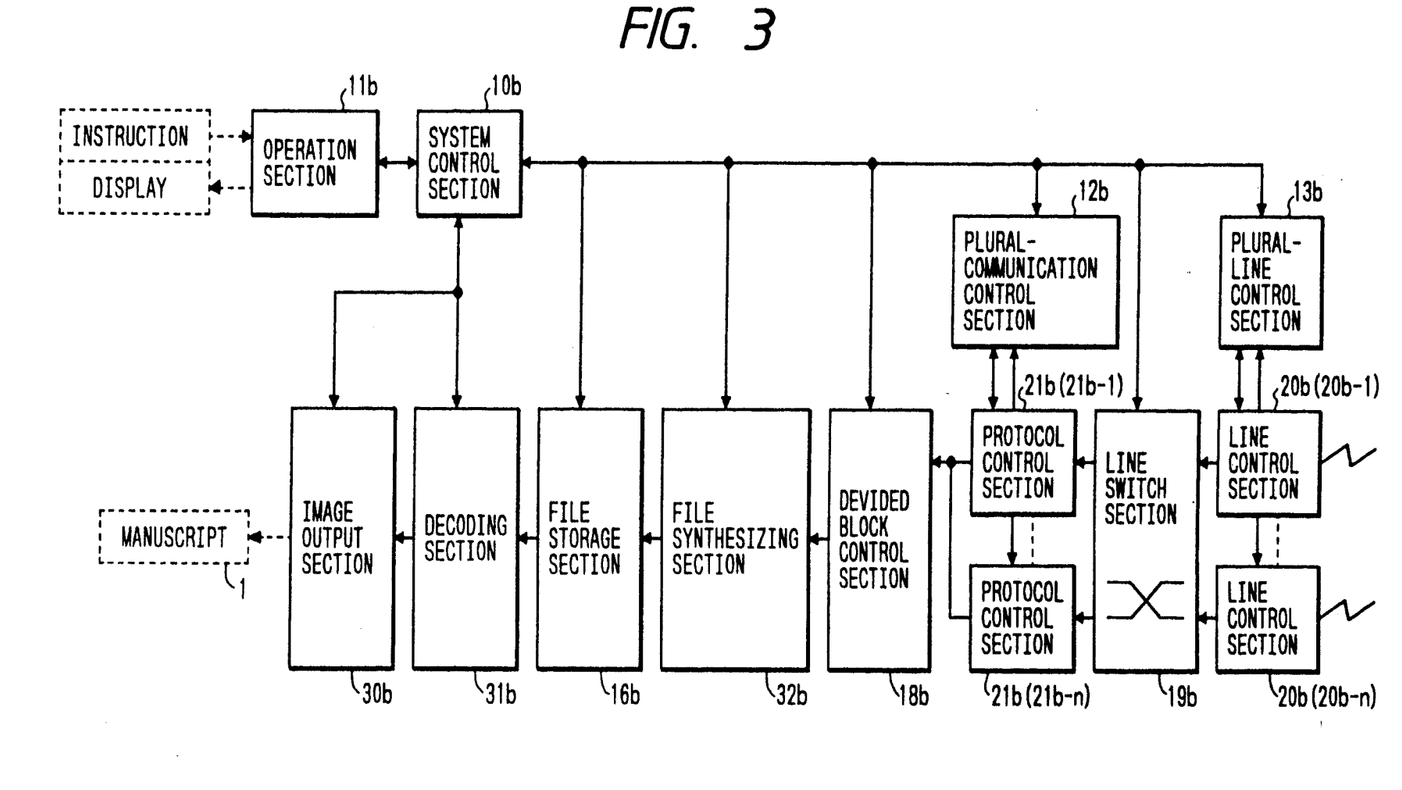
FIG. 3 is a block diagram showing an arrangement of the facsimile device when it operates in a receiving mode.

A facsimile device as one specific example of the communication stations of the data communication system to which the invention is applied will be described with reference to FIGS. 2 and 3. FIG. 2 is a block diagram showing an arrangement of the facsimile device when it operates in a transmitting mode. FIG. 3 is a block diagram showing an arrangement of the facsimile device when it operates in a receiving mode. In those figures, like reference numerals are used for designating like or equivalent portions, but for distinctive purposes, a letter "a" is affixed to the reference numerals in the transmitting station and a letter "b", to the reference numerals in the receiving station.

The arrangement of the facsimile device when it operates in a transmitting mode will be described with reference to FIG. 2. The facsimile device operating in the transmitting mode will be referred to a transmitting station, for ease of explanation.

In the figure, an operation section 11a, including operation keys, such as a ten-key and function keys, and a display unit, outputs information entered by an operator to a system control section 10a. The system control section 10a controls the whole system of the facsimile device.

An image input section 14a reads information on an original document or manuscript 1, and converts the document information into electrical communication data signals. The communication data is output to an encoding section 15a. The encoding section 15a encodes the communication data and transfers it to a file storage section 16a.

Figure 7:
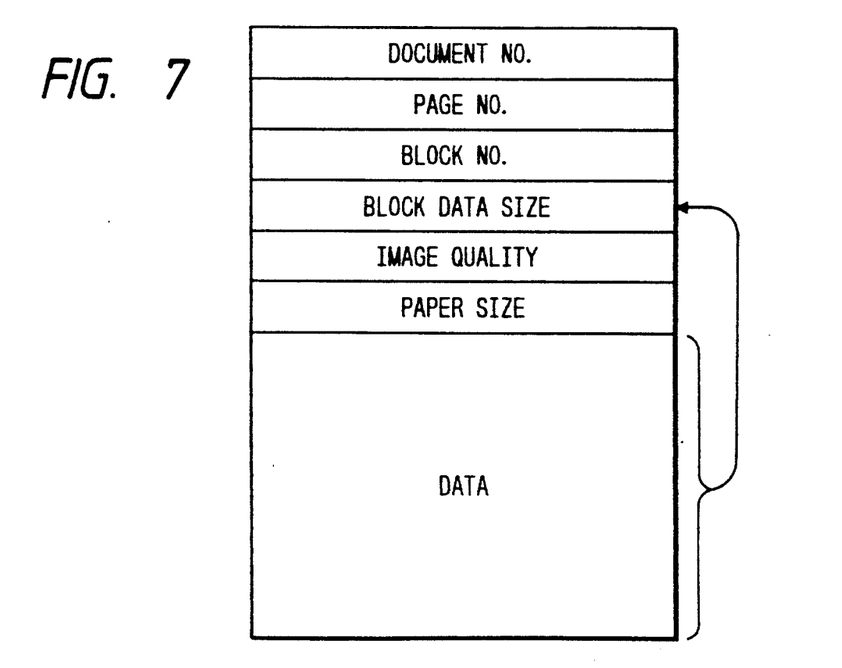
FIG. 7 is a diagram showing a model of the structure of block data.

The file storage section 16a stores the coded communication data in the form of an image file. A file dividing section 17a receives the communication data from the file storage section 16a and divides the data into a plurality of data blocks. In a divided block control section 18a, control data, such as document No., page No., block No., block data size, page size, and image quality, is added to each block data, and the result is output (see FIG. 7).

A block delivery control section 33a transfers the block data to protocol control sections 21a-1 through 21a-n. In each of the protocol control sections 21a-1 through 21a-n, the received block data is transmitted to a receiving station after performing a usual protocol process. A plural-communication control section 12a controls the protocol control sections 21a-1 through 21a-n.

In response to a transmission instruction issued when a one-touch dial or a quick dial is operated, line control sections 20a-1 through 20a-n each automatically calls a receiving station to connect the communication line to the called station.

In an instruction from the system control section 10a, a line switch section 19a provides proper connections of the protocol control sections 21a-1 through 21a-n with the line control sections 20a-1 through 20a-n. A plural-line control section 13a controls the line control sections 20a-1 through 20a-n.

Turning now to FIG. 3, there is shown the arrangement of the facsimile device when it operates in a receiving mode. In the description of FIG. 3, which follows, only the sections relating in particular to the receiving mode will be given.

A file synthesizing section 32b synthesizes or composes a plurality of block data received from a divided block control section 18b according to the control data attached to the block data, and outputs the composed data to a file storage section 16b. A decoding section 31b decodes the communication data, which is derived from the file storage section 16b. An image output section 30b reproduces the decoded communication data of the manuscript 1.

Figure 4:
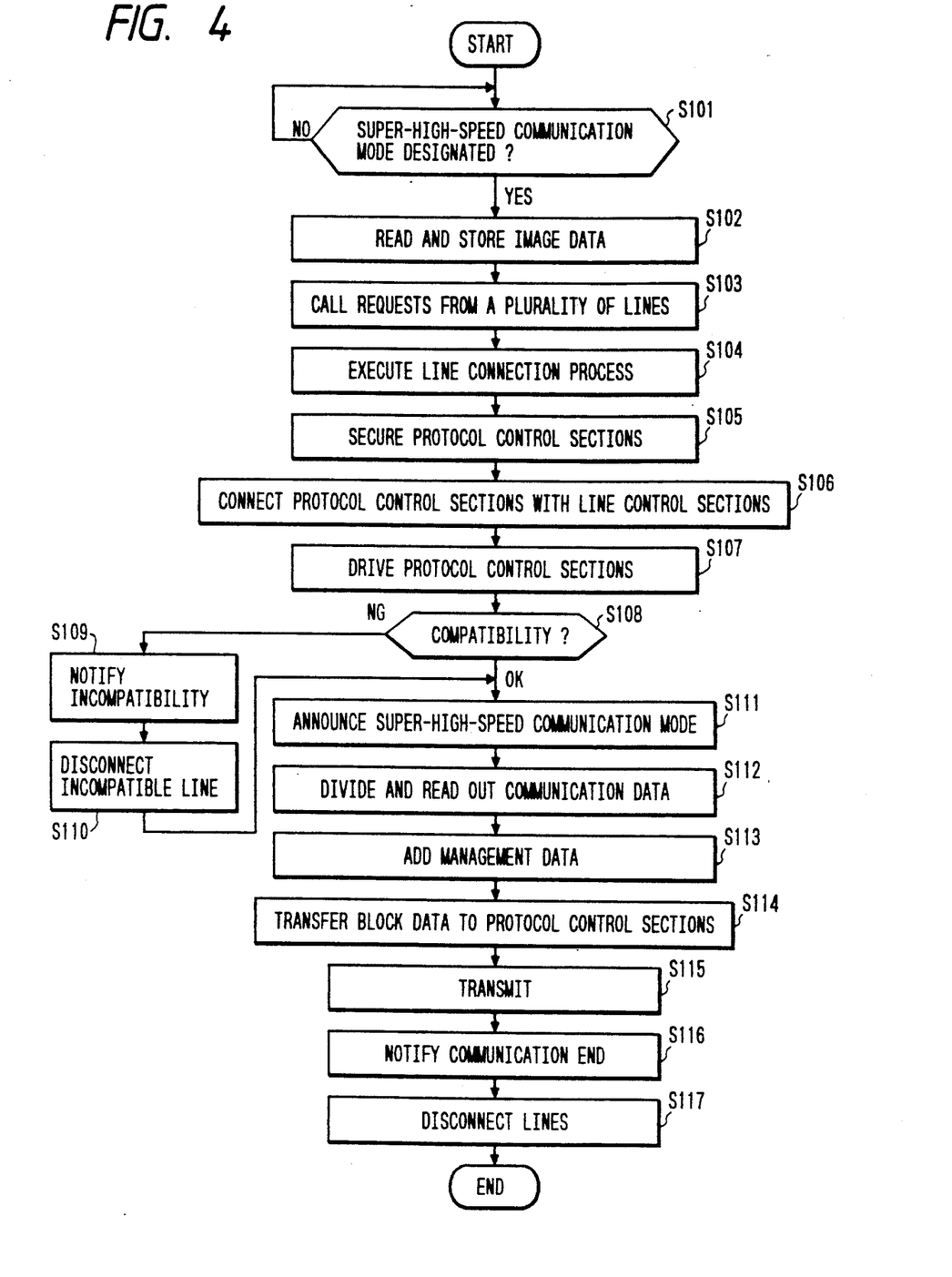
FIG. 4 is a flow chart showing a flow of operations of the facsimile device when it operates in the transmitting mode.

The operation of the facsimile device when it operates in a transmitting mode will be described with reference to FIG. 4. The facsimile device operating in the transmitting mode will be referred to as a receiving station, for ease of explanation.

In step S101, check is made as to if a communication mode has been set to a super-high-speed communication mode. Specifically, an operator operates related keys on the operation section 11a to specify a super-high-speed communication mode. In response to the mode specifying operation, the operation section 11a sends an instruction for the super-high-speed communication to the system control section 10a.

In step S102, the system control section 10a instructs the image input section 14a to read an image on the manuscript 1. The image input section 14a reads the document image, converts it into electrical communication data, and sends it to the encoding section 15a. The encoding section 15a transforms the data using an appropriate suitable coding system, and stores the coded data in the file storage section 16a.

In step S103, the system control section 10a sends call requests, which depend on the number of released communication lines (e.g., four communication lines), to the plural-line control section 13a. Then, the plural-line control section 13a sends the call requests to the four line control sections 20a (e.g., 20a-1 through 20a-4).

In step S104, the four line control sections 20a-1 through 20a-4, when receiving the call requests, perform call connection processes suitable for the line interface, and send the process results to the plural-line control section 13a. In turn, the plural-line control section 13a sends the process results to the system control section 10a.

Figure 8:
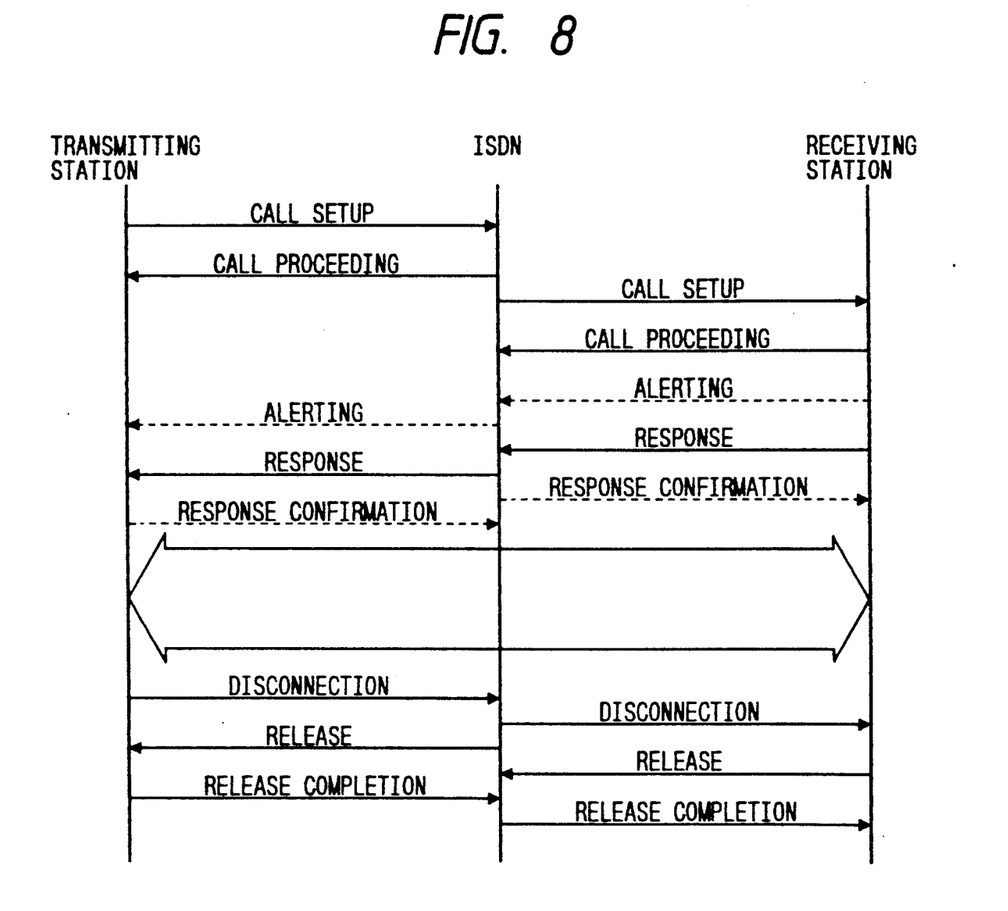
FIG. 8 is a diagram showing a sequence of procedural steps of a call connection process for an ISDN.

FIG. 8 is a diagram showing a sequence of procedural steps of a call connection process for an ISDN.

The following signals, as shown, are transferred between the transmitting station and the ISDN, and between the ISDN and the receiving station: the signals of "call setup", "call proceeding", "altering", "response", and "response confirmation". When the dialing process according to the call control procedure is normally completed, a path (circuit) is set up between the transmitting station and the receiving station.

In step S105, the system control section 10a secures the protocol control sections 21a, which correspond to the line control sections 20a of which the paths have been set up through the dialing process. In the instance of the embodiment, the paths of three line control sections 20a-1 through 20a-3 of those four line control sections have been set up. The path of the line control section 20a-4 has not been set up. Accordingly, the protocol control sections 21a-1 through 21a-3 are secured by the system control section 10a.

In step S106, the system control section 10a controls the line switch section 19a to connect the secured protocol control sections 21a-1 through 21a-3 respectively with the line control sections 20a-1 through 20a-3.

In step S107, the system control section 10a sends a protocol start-up request to the plural-communication control section 12a. Then, the plural-communication control section 12a sends a protocol start-up request to the protocol control sections 21a-1 through 21a-3, so that the protocol processes start to run.

In step S108, the protocol control sections 21a-1 through 21a-3 check the compatibility with their receiving stations by using a means for sending a nonstandard function of the protocol.

The compatibility check process based on the nonstandard function is performed by detecting whether or not the NSF delivered from the receiving station contains a statement of the super-high-speed communication mode when the communication mode is G3.

When the communication mode is G4, it is performed by detecting whether or not the nonstandard function of RSSP delivered from the receiving station contains a statement of the super-high-speed communication mode.

The protocol control section 21a, which is incompatible with the receiving station, sends an incompatible message to the plural-communication control section 12a (step S109).

In step S110, the plural-communication control section 12a returns a protocol stop request to the protocol control section 21a, which issued the incompatibility message, and also to the system control section 10a. In response to the protocol stop request, the system control section 10a sends to the plural-line control section 13a a disconnection request for disconnecting the incompatible communication line. The plural-line control section 13a sends a disconnection request to the line control section 20a coupled with the incompatible communication line, thereby perfectly disconnecting that communication line.

The compatible-confirmed protocol control sections 21a, in step S111, sends a message stating that data transmission will start in a super-high-speed communication mode, to the receiving stations in accordance with their protocols.

For the message, the information to start the super-high-speed communication mode is set in the NSS when the communication mode is G3. When it is G4, the information to start the super-high-speed communication mode is set in the nonstandard function of CDCL.

In step S112, the system control section 10a sends to the block delivery control section 33a an internal-line number to specify the compatible-confirmed protocol control sections 21a, and at the same time instructs the file dividing section 17a to read out communication data. The file dividing section 17a reads out the communication data from the file storage section 16a every data block of a preset size, and transfers the read out data to the divided block control section 18a.

In step S113, the divided block control section 18a attaches control data, such as document No., page No., block No., block data size, page size, and image quality, to each block data, and transfers the resultant data to the block delivery control section 33a.

In step S114, the block delivery control section 33a successively transfers block data to the protocol control sections 21a-1 through 21a-3 secured by the system control section 10a.

In step S115, the protocol control sections 21a-1 through 21a-3 execute the protocol processes in a usual way, and transmits the block data to the receiving stations. When these protocol control sections completes the transmission of the final block data received from the block delivery control section 33a, they output transmission end signals to the plural-communication control section 12a.

In step S116, the plural-communication control section 12a sends a protocol stop request to the protocol control sections 21a which has output the transmission end signal, and sends a signal indicating the communication end of the related communication lines to the system control section 10a.

In step S117, the system control section 10a outputs to the plural-line control section 13a a disconnecting request signal to disconnect the related lines. The plural-line control section 13a outputs a disconnection request to the line control sections 20a coupled with the designated lines.

At this time, signals of "disconnection", "release" and "release completion" are transferred between the transmitting station and the ISDN, and between the ISDN and the receiving station, whereby completing a sequence of communication operations, as shown in FIG. 8.

After the system control section 10a confirms the release completion, the system control section 10a releases all of the related systems, and prepares for the next communication. When the communication on the lines thus far used completes, the system control section 10a further releases the plural-communication control section 12a and the plural-line control section 13a in preparation for the next communication.

Figure 5:
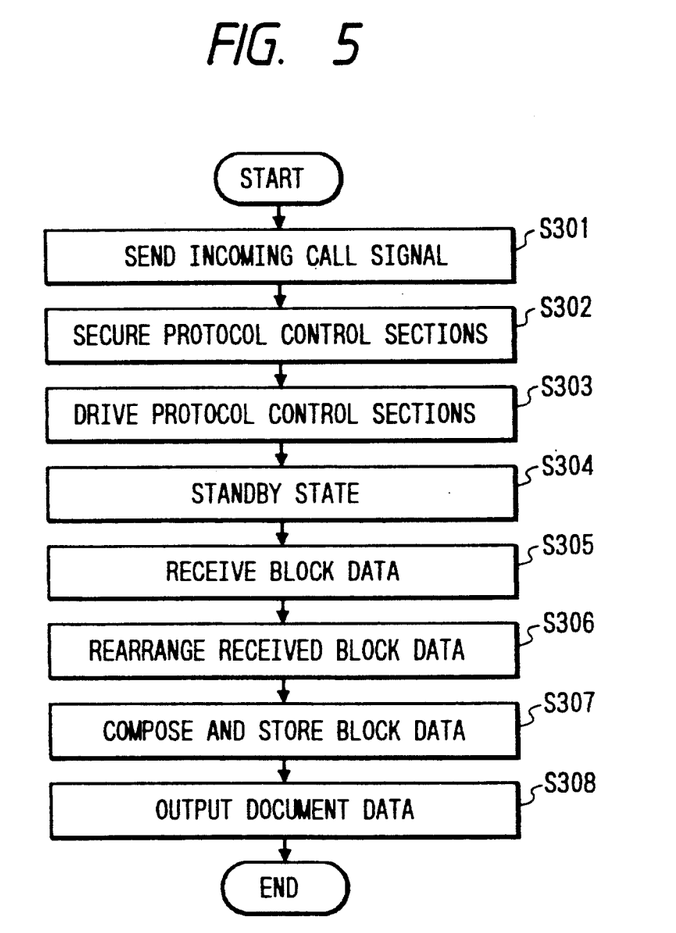
FIG. 5 is a flow chart showing a flow of operations of the facsimile device in the receiving mode.

FIG. 5 is a flow chart showing a flow of operations of the facsimile device in the receiving mode.

When arrival of a call from the transmitting station is detected, the line control sections 20b in step S301 send a signal indicative of the call arrival through the plural-line control section 13b to the system control section 10b.

In step S302, the system control section 10b secures the protocol control sections 21b coupled with the terminating line.

In step S303, the system control section 10b outputs a protocol drive request through the plural-communication control section 12b to the protocol control sections 21b, whereby to drive the related protocols.

In step S304, the system control section 10b drives the divided block control section 18b, the file synthesizing section 32b, and the file storage section 16b to place them to a standby state.

Upon start of transmitting the communication data, the protocol control sections 21b transfer the received block to the divided block control section 18b (step S305).

In step S306, the divided block control section 18b rearranges the block data according to the control data attached to the block data, and outputs the rearranged block data to the file synthesizing section 32b.

In step S307, the file synthesizing section 32b synthesizes or composes the block data and stores the composed data into the file storage section 16b.

When the data transmission ends and an image file is completed, the system control section 10b drives the image output section 30b to output an image of the received manuscript 1 (step S308).

Figure 9:
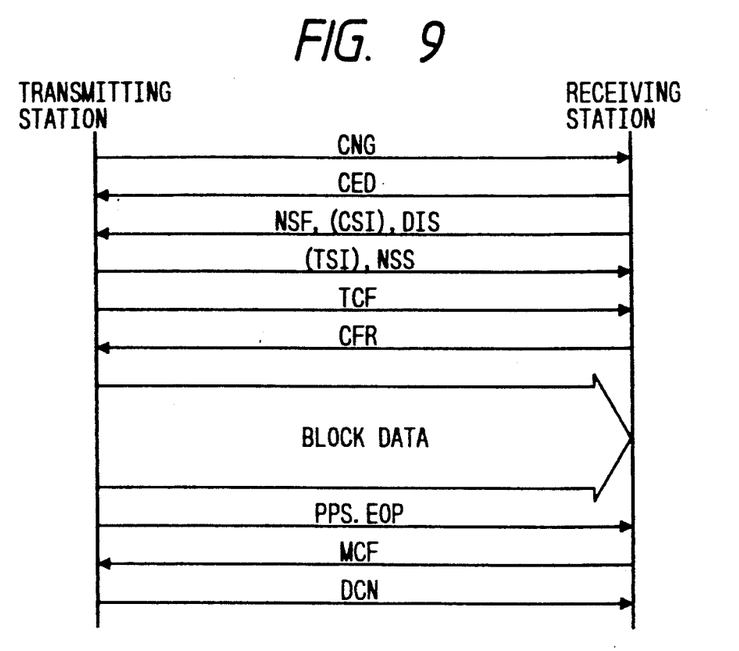
FIG. 9 is a diagram showing a protocol when the communication mode is G3.

FIG. 9 is a diagram showing a protocol when the communication mode is G3.

When a transmitting station calls a receiving station, a CNG signal is sent to the receiving station. The receiving station, when receiving the CNG signal, sends a CED (called station identifying) signal, and then an NSF (nonstandard function setting) signal and a DIS (digital identifying) signal.

In the case of the receiving station having a super-high-speed communication function, the NSF signal contains information indicative of the super-high-speed communication function. In this instance of the embodiment, the transmitting station judges the compatibility on the basis of the NSF signal.

The transmitting station, when receiving the NSF signal, attaches the information to start the super-high-speed communication mode to an NSS (nonstandard function setting) signal, and sends the resultant signal to the receiving station.

Thereafter, the transmitting station sends a TCF (training check) signal to the receiving station. In response to this, the receiving station sends a CFR (reception-ready confirmation) signal to the transmitting station.

The transmitting station, when receiving the CFR signal, sends block data to the receiving station. After completing all the block data, the transmitting station sends a PPS.EOP signal to the receiving station.

When receiving the PPS.EOP signal, the receiving station sends an MCF (message confirmation) signal to the transmitting station. Finally, the transmitting station sends a DCN (circuit disconnection command) signal to the receiving station, thereby completing the protocol for the G3 mode.

Figure 10:
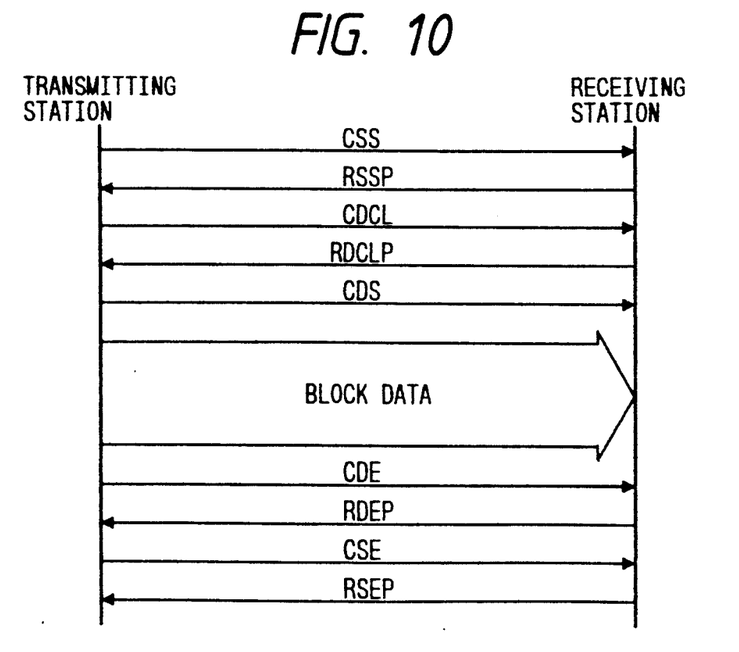
FIG. 10 is a diagram showing a protocol when the communication mode is G4.

FIG. 10 is a diagram showing a protocol when the communication mode is G4.

When a transmitting station calls a receiving station, the transmitting station sends a CSS (session start command) signal to the receiving station. In response to the CSS signal, the receiving station returns an RSSP (session start affirmative response) signal to the transmitting station.

In the case of the receiving station having a super-high-speed communication function, the RSSP signal contains information indicative of the super-high-speed communication function. In this instance of the embodiment, the transmitting station judges the compatibility on the basis of the RSSP signal.

The transmitting station, when receiving the RSSP signal, attaches the information to start the super-high-speed communication mode to an CDCL (document function list command) signal, and sends the resultant signal to the receiving station.

Thereafter, the receiving station sends an RDCLP (document function list affirmative response) signal to the transmitting station. When receiving the RDCLP signal, the transmitting station sends a CDS (document start command) signal to the receiving station, and then sends the block data to the receiving station.

When all of the block data has been sent to the receiving station, the transmitting station sends a CDE (document end command) signal. Further, the receiving station sends an RDEP (document end affirmative response) signal to the transmitting station.

Finally, the transmitting station sends a CSE (session end command) to the receiving station. In response to this, the receiving station sends an RSEP (session end affirmative response) signal to the transmitting station. Here, the protocol for the G4 mode ends.

Figure 6:
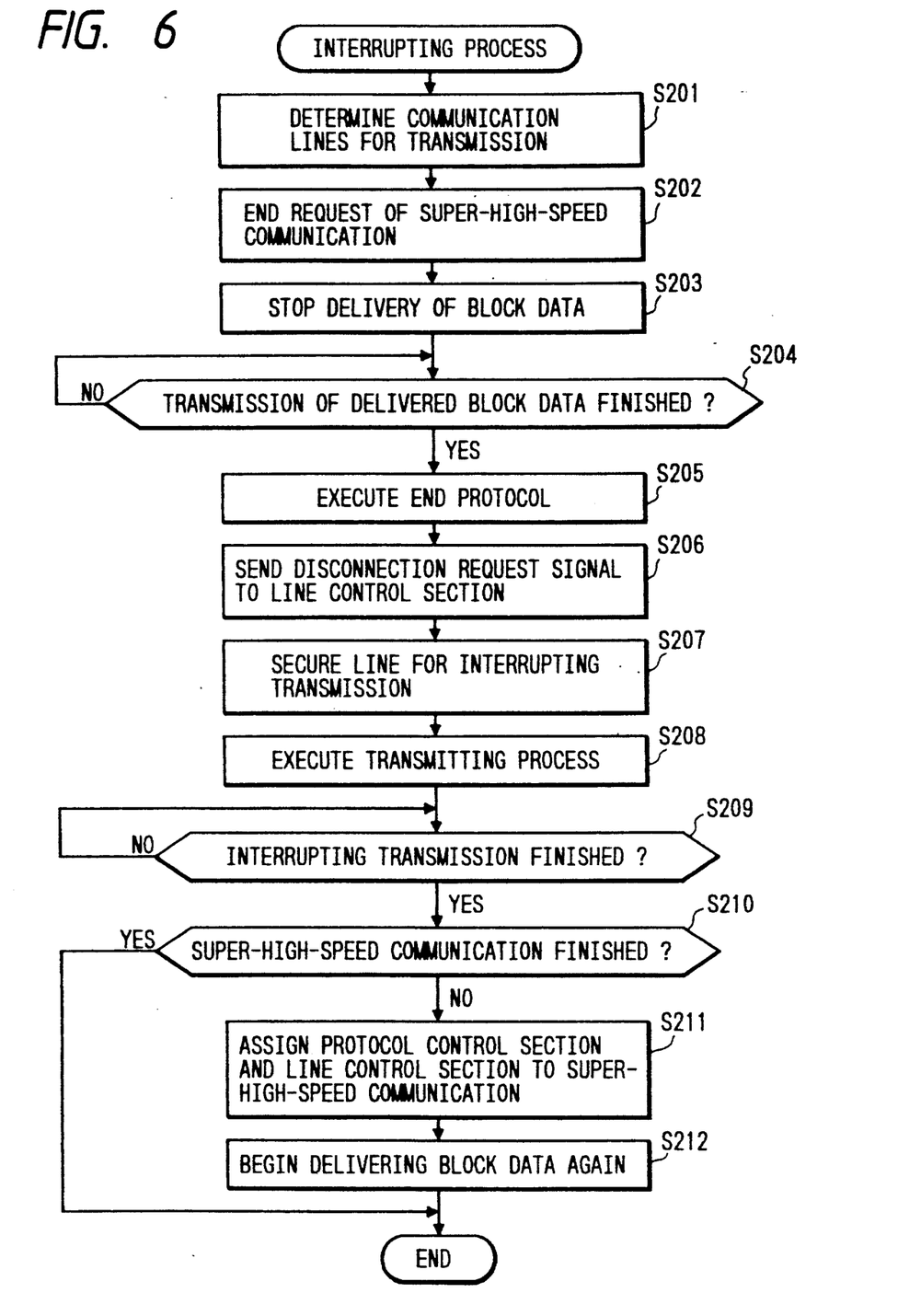
FIG. 6 is a flow chart showing a flow of operations of the facsimile device in an interrupting mode.

In a case where no idle line is present during the super-high-speed communication, if an operator operates the operation section 11a to instruct a new sending of data, an interruption transmitting process will be executed. FIG. 6 is a flow chart showing an interruption transmitting process according to the invention.

When the interrupting transmission is instructed, the operation section 11a sends an interruption request signal to the system control section 10a, which in turn determines the communication line to be used for the interrupting transmission (step S201).

In step S202, the system control section 10a outputs an end request signal for ending the super-high-speed communication performed under control of the protocol control section 21a (e.g., 21a-3) coupled with the line for the interrupting transmission, to the plural-communication control section 12a and the block delivery control section 33a.

In step 203, the system control section 10a controls the block delivery control section 33a to stop the delivery of the block data to the protocol control section 21a-3. As a result, in the super-high-speed communication mode, the block delivery control section 33a delivers the block data to only the protocol control sections 21a-1 and 21a-2.

In step S204, the plural-communication control section 12a instructs the protocol control section 21a-3 to end the data transmission. In response to the transmission end instruction, the protocol control section 21a-3 executes an end protocol after completion of the block data already delivered from the block delivery control section 33a (step S205).

In step S206, the system control section 10a outputs a disconnection request to the line control section 20a (e.g., 20a-3) coupled with the protocol control section 21a-3.

In step S207, the line control section 20a-3, which was released, performs a connection process for a call adaptable for the line interface to secure a communication line connecting to the receiving station for the interrupting transmission. When the communication line is secured, the protocol control section 21a-3 is driven.

In step S208, the interrupting transmission is performed in a normal transmission mode, with the cooperation of the protocol control section 21a-3 and the line control section 20a-3.

After it is determined in step S209 that the interrupting transmission has ended, the check is made as to whether or not the super-high-speed communication has been completed (step S210).

If the super-high-speed communication has not been completed yet, the protocol control section 21a-3 and the line control section 20a-3, which have been used of the interrupting transmission, are again assigned to the super-high-speed communication (step S211).

In step S212, the system control section 10a causes the block delivery control section 33a to start again the delivery of the block data to the protocol control section 21a-3. As a result, as for the super-high-speed communication, the block delivery control section 33a delivers again block data to the protocol control sections 21a-1 through 21a-3. This state is the same as before the interrupt process is executed.

During the interrupting transmission, if another interruption request is presented, the system control section 10a releases another set of the protocol control section 21a-1 and the line control section 20a, and executes the interrupting transmission.

As described above, the data communication system in the embodiment has the function of interrupting transmission. Accordingly, in a super-high-speed communication where communication data are transmitted in parallel through a plurality of communication lines, if all of the communication lines are used for the super-high-speed communication, another document image can be transmitted without hindering other data transmission thus far progressed.

While the interrupting transmission has been described using the case where all of the communication lines are occupied by the data transmission in a super-high-speed communication, the interrupting transmission of the invention is operable in a normal communication mode. For example, in a case where the communication lines are used by the super-high-speed communication and the normal communication, another new document can be transmitted if some of the communication lines are released for the interrupting transmission.

Furthermore, in the just-mentioned embodiment, the interrupting transmission is processed in the normal communication mode. If necessary, a plurality of communication lines may be released for another super-high-speed communication, during the interrupting process.

As seen from the foregoing description, according to the invention, another document image can be transmitted without hindering other data transmission thus far progressed even under the condition that in a super-high-speed communication where communication data are transmitted in parallel through a plurality of communication lines, all of the communication lines are used for the super-high-speed communication.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data communication method in which a transmitting station divides data into a plurality of data blocks and transmits the data blocks in parallel through a plurality of communication lines, and a receiving station receives the data blocks transmitted from the transmitting station through the plurality of communication lines and composes the data blocks into original data, said data communication method comprising the steps of:

detecting that a new transmission request is present during a parallel data transmission through a plurality of communication lines;

releasing at least one of the communication lines to continuously use the remaining communication lines for the parallel data transmission in response to the detected new transmission request; and performing a new data transmission through the released communication line.

2. The data communication method according to claim 1, wherein when the new data transmission has been completed before the parallel data transmission is completed, the released communication line and the remaining ones are both used for the parallel data transmission.

3. The data communication method according to claim 1, wherein said new transmission request requests a data transmission using a plurality of communication lines in a super-high-speed communication mode.

4. The data communication method according to claim 1, wherein said new data transmission uses the released communication line and a free communication line.

* * * * *